US009147266B2

(12) United States Patent
Honda

(10) Patent No.: US 9,147,266 B2
(45) Date of Patent: Sep. 29, 2015

(54) IMAGE PROCESSING APPARATUS AND IMAGE PROCESSING METHOD

(75) Inventor: Yoshiaki Honda, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 13/989,019

(22) PCT Filed: Nov. 2, 2011

(86) PCT No.: PCT/JP2011/075886
§ 371 (c)(1),
(2), (4) Date: May 22, 2013

(87) PCT Pub. No.: WO2012/073668
PCT Pub. Date: Jun. 7, 2012

(65) Prior Publication Data
US 2013/0243318 A1 Sep. 19, 2013

(30) Foreign Application Priority Data
Dec. 1, 2010 (JP) ................................ 2010-268718

(51) Int. Cl.
G06K 9/34 (2006.01)
G06T 11/00 (2006.01)
(Continued)

(52) U.S. Cl.
CPC .............. *G06T 11/001* (2013.01); *G06T 5/002* (2013.01); *H04N 9/045* (2013.01); *G06T 2207/20192* (2013.01)

(58) Field of Classification Search
USPC .................................. 382/167, 260, 274, 300
See application file for complete search history.

(56) References Cited

U.S. PATENT DOCUMENTS 6,882,364 B1 * 4/2005 Inuiya et al. .................. 348/252
6,971,382 B1 12/2005 Corso
(Continued)

FOREIGN PATENT DOCUMENTS

CN 1600020 A 3/2005
CN 101103374 A 1/2008
(Continued)

OTHER PUBLICATIONS

Chinese Office Action dated Dec. 31, 2014 in counterpart Chinese Application No. 201180058289.7.

Primary Examiner — Phuoc Tran
(74) Attorney, Agent, or Firm — Fitzpatrick, Cella, Harper & Scinto

(57) ABSTRACT

An image processing apparatus comprises means for generating, from first-resolution image data including signals according to a plurality of color filters, second-resolution image data including signals according to the plurality of color filters at a resolution lower than the first-resolution image data; means for generating luminance signals from the signals according to the plurality of color filters of the second-resolution image data; means for storing image data including the luminance signals generated from the second-resolution image data; means for generating image data, which includes signals according to the plurality of color filters as many as the number of pixels of the first-resolution image data, from the stored image data and includes the luminance signals; and means for combining the signals according to the plurality of color filters of the first-resolution image data and signals according to the plurality of color filters of the image data output from the conversion means.

13 Claims, 6 Drawing Sheets

(51) Int. Cl.
*H04N 9/04* (2006.01)
*G06T 5/00* (2006.01)

(56) References Cited

U.S. PATENT DOCUMENTS

| | | |
|---|---|---|
| 7,308,152 B2 | 12/2007 | Ito |
| 7,688,362 B2 * | 3/2010 | Glenn .......................... 348/235 |
| 7,898,583 B2 | 3/2011 | Wakahara et al. |
| 8,265,412 B2 * | 9/2012 | Ishiga .......................... 382/260 |
| 8,351,731 B2 | 1/2013 | Guan |
| 8,471,933 B2 | 6/2013 | Matsushita et al. |
| 2006/0152596 A1 | 7/2006 | Adams, Jr. et al. |
| 2008/0122953 A1 | 5/2008 | Wakahara et al. |
| 2009/0040339 A1 | 2/2009 | Lee |

FOREIGN PATENT DOCUMENTS

| | | |
|---|---|---|
| CN | 101119448 A | 2/2008 |
| CN | 101365041 A | 2/2009 |
| CN | 101854462 A | 10/2010 |
| JP | 5145940 | 6/1993 |
| JP | 2000-341709 | 12/2000 |
| JP | 2001-45308 | 2/2001 |
| JP | 2004-172987 | 6/2004 |
| JP | 2007-180893 | 7/2007 |
| JP | 2008-15741 | 1/2008 |

\* cited by examiner

IMAGE PROCESSING APPARATUS AND IMAGE PROCESSING METHOD

TECHNICAL FIELD

The present invention relates to an image processing technique in an image processing apparatus.

BACKGROUND ART

An image sensing apparatus such as a digital camera is required to precisely remove noise components, so as to meet user's requirements for a still higher sensitivity and a larger number of pixels.

As a conventional noise reduction method, for example, Japanese Patent Laid-Open No. 2008-015741 describes a technique which divides an image into a plurality of frequency bands, removes noise components from high-frequency components, preserves edge components of the high-frequency components, and combines these high-frequency components and low-frequency components.

As a conventional signal processing method, for example, Japanese Patent Laid-Open No. 2001-045308 describes a technique for setting different gammas in luminance signal processing and chrominance signal processing.

Furthermore, as another conventional signal processing method, a technique for generating luminance signals from R, G, and B signals after gamma processing is available.

A conventional arrangement will be described below with reference to FIG. 4.

Referring to FIG. 4, input image data 3000 is RGB Bayer matrix data, and is stored in a memory 3010. The image data stored in the memory 3010 will be referred to as first-resolution image data. The input image data 3000 undergoes low-pass filter processing by an LPF 3101 and down-sampling (reduction) processing by a DS unit 3102 to generate second-resolution image data, which has a resolution lower than the first-resolution image data, and the second-resolution image data is stored in a memory 3110. At this time, the data in the memory 3110 is synchronized for respective color filters to be data in which each pixel has signals of all of R, G, and B color filters. This second-resolution image data undergoes low-pass filter processing by an LPF 3201 and down-sampling processing by a DS unit 3202 to generate third-resolution image data, which has a still lower resolution and is synchronized. The generated data is stored in a memory 3210.

An NR processing unit 3011 applies noise reduction processing to the first-resolution image data output from the memory 3010, and an edge detection unit 3012 detects edge intensities of the first-resolution image data output from the memory 3010. An NR processing unit 3111 applies noise reduction processing to the second-resolution image data output from the memory 3110, and an edge detection unit 3112 detects edge intensities of the second-resolution image data output from the memory 3110. An NR processing unit 3211 applies noise reduction processing to the third-resolution image data output from the memory 3210, and stores the image data after the noise reduction processing in a memory 3221.

A US unit 3222 applies up-sampling (enlargement) processing to the third-resolution image data stored in the memory 3221, thus generating image data having the same number of pixels as the second-resolution image data. A combining unit 3120 combines the image data output from the NR processing unit 3111 and that output from the US unit 3222 using edge intensity detection signals output from the edge detection unit 3112. More specifically, the combining unit 3120 mixes these two data while increasing a weight of the image data output from the NR processing unit 3111 for a pixel which is determined by the edge detection unit 3112 to have a large edge intensity. Conversely, the combining unit 3120 mixes these two data while increasing a weight of the image data output from the US unit 3222 for a pixel which is determined to have a small edge intensity.

The image data output from the combining unit 3120 is temporarily stored in a memory 3121, and a US unit 3122 applies up-sampling processing to the image data stored in the memory 3121, thus generating image data having the same number of pixels as the first-resolution image data. A combining unit 3020 combines the image data output from the NR processing unit 3011 and that output from the US unit 3122 using edge intensity detection signals output from the edge detection unit 3012. The combining unit 3120 then stores the combined image data in a memory 3030. More specifically, the combining unit 3020 mixes these two image data while increasing a weight of the image data output from the NR processing unit 3011 for a pixel which is determined by the edge detection unit 3012 to have a large edge intensity. Conversely, the combining unit 3020 mixes these two image data while increasing a weight of the image data output from the US unit 3122 for a pixel which is determined to have a small edge intensity.

R, G, and B signals of the image data output from the memory 3030 are respectively input to an R gamma circuit 3032, G gamma circuit 3033, and B gamma circuit 3034 since they individually undergo gamma processes. Also, chrominance signals (U, V) of the image data output from the memory 3030 are input to a chrominance signal processing circuit 3031 since they undergo chrominance signal processing. That is, the memory 3030 is required to store the R, G, and B signals for luminance signals, and the U and V signals for chrominance signals.

For this reason, the two image data input to the combining unit 3020 are required to respectively include the R, G, and B signals for luminance signals and the U and V signals for chrominance signals. Thus, since the memories 3121 and 3221 require synchronized data as both the luminance and chrominance signals, they require data for a total of five planes, that is, R, G, and B data for luminance signals and U and V data for chrominance signals, resulting in a large circuit scale. Note that the U and V signals are generated by a known method before each NR processing unit applies the noise reduction processing, and each NR processing unit applies the noise reduction processing to the R, G, B, U, and V signals.

Another conventional arrangement will be described below with reference to FIG. 5. In this example, image data output from the memory 3030 is input to a Y gamma circuit 3035 in place of the R gamma circuit 3032, G gamma circuit 3033, and B gamma circuit 3034 in FIG. 4. That is, the memory 3030 is required to store image data including Y signals for luminance signals and U and V signals for chrominance signals. For this reason, the two image data input to the combining unit 3020 need only be those each of which includes Y signals for luminance signals and U and V signals for chrominance signals. Hence, the memories 3121 and 3221 need only store data of a total of three planes, that is, Y signals for luminance signals and U and V signals for chrominance signals, thus reducing the capacities of the memories 3121 and 3221. Note that the Y, U, and V signals are generated by a known method before each NR processing unit applies the noise reduction processing, and each NR processing unit applies the noise reduction processing to the Y, U, and V signals.

In the arrangement shown in FIG. 4, the capacities of the memories 3121 and 3221 become large, resulting in a large circuit scale. In the arrangement shown in FIG. 5, which can solve this problem, since the gamma processing is applied after the Y signals are generated, image quality lowers compared to the arrangement in which luminance signals are generated from R, G, and B signals after the gamma processing.

SUMMARY OF INVENTION

The present invention has been made in consideration of the aforementioned problems, and realizes an image processing technique which can reduce a circuit scale while maintaining high image quality.

In order to solve the aforementioned problems, the present invention provides an image processing apparatus comprising: image generation means for generating, from first-resolution image data including signals according to a plurality of color filters, second-resolution image data including signals according to the plurality of color filters at a resolution lower than the first-resolution image data; luminance signal generation means for generating luminance signals from the signals according to the plurality of color filters of the second-resolution image data; storage means for storing image data including the luminance signals generated from the second-resolution image data; conversion means for generating image data, which includes signals according to the plurality of color filters as many as the number of pixels of the first-resolution image data, from the image data which is stored in the storage means and includes the luminance signals; and combining means for combining the signals according to the plurality of color filters of the first-resolution image data and signals according to the plurality of color filters of the image data output from the conversion means.

In order to solve the aforementioned problems, the present invention provides an image processing method comprising: an image generation step of generating, from first-resolution image data including signals according to a plurality of color filters, second-resolution image data including signals according to the plurality of color filters at a resolution lower than the first-resolution image data; a luminance signal generation step of generating luminance signals from the signals according to the plurality of color filters of the second-resolution image data; a storage step of storing image data including the luminance signals generated from the second-resolution image data; a conversion step of generating image data, which includes signals according to the plurality of color filters as many as the number of pixels of the first-resolution image data, from the image data which is stored in the storage step and includes the luminance signals; and a combining step of combining the signals according to the plurality of color filters of the first-resolution image data and signals according to the plurality of color filters of the image data output from the conversion step.

According to the present invention, an image processing technique that can reduce a circuit scale while maintaining high image quality can be realized.

Further features of the present invention will become apparent from the following description of exemplary embodiments (with reference to the attached drawings).

DESCRIPTION OF EMBODIMENTS

Embodiments of the present invention will be described in detail hereinafter. Note that embodiments to be described hereinafter are examples required to realize the present invention, and are to be modified or changed as needed depending on arrangements of apparatuses to which the present invention is applied and various conditions, and the present invention is not limited by the following embodiments. Also, some of embodiments to be described below may be combined as needed.

First Embodiment

The arrangement of an image processing apparatus according to the first embodiment of the present invention will be described below with reference to FIG. 1. This image processing apparatus is controlled by a CPU (not shown). This image processing apparatus can be an apparatus including an image processing function, and may be configured by, for example, a digital camera, a mobile phone with a camera function, or a personal computer.

Figure 1:
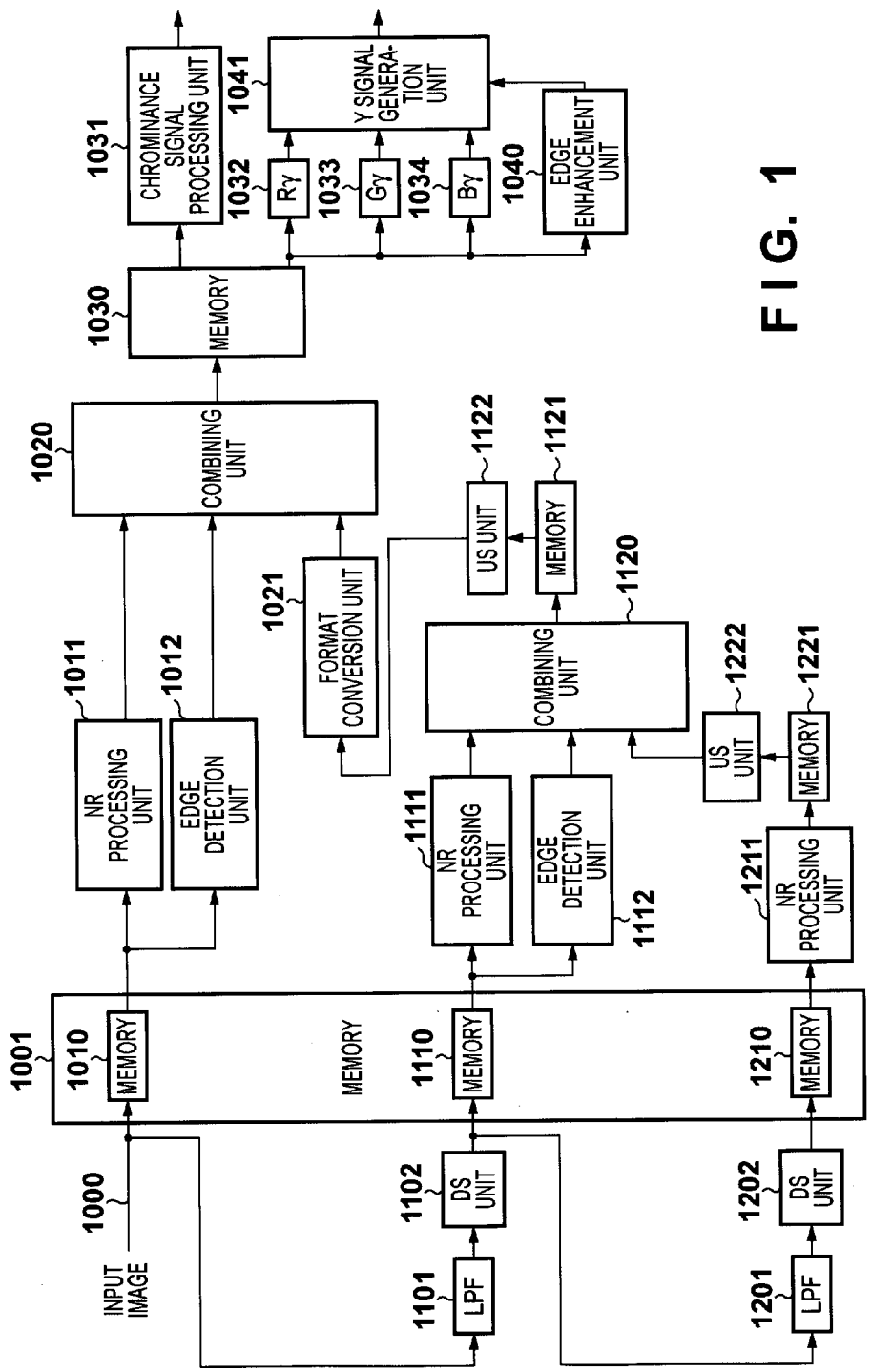
FIG. 1 is a block diagram showing the arrangement of an image processing apparatus according to the first embodiment of the present invention.

Referring to FIG. 1, input image data 1000, which is output from an image sensing element of an image sensing apparatus such as a digital camera (not shown), and has a Bayer matrix according to R, G, and B color filers, is stored in a memory 1010. A memory 1001 includes the memory 1010 and memories 1110 and 1210. This input image data 1000 has undergone known sensor correction processing such as dark current correction and shading correction, and will be referred to as first-resolution image data. The input image data 1000 undergoes low-pass filter processing by an LPF 1101 and down-sampling (reduction) processing by a DS unit 1102, thus generating synchronized second-resolution image data. The generated image data is stored in the memory 1110. Furthermore, the second-resolution image data output from the DS unit 1102 undergoes low-pass filter processing by an LPF 1201, and down-sampling processing by a DS unit 1202, thus generating third-resolution image data, which has a lower resolution than the second-resolution image data. The third-resolution image data is stored in the memory 1210. In this way, the memory 1001 stores image data of a plurality of resolutions, which data have different numbers of pixels.

Processing to be applied to the first-resolution image data which is stored in the memory 1010 and has the highest resolution will be described first.

An NR processing unit 1011 synchronizes the first-resolution image data output from the memory 1010 to generate R, G, and B signals for each pixel, and generates U and V signals of chrominance components by:

$$U = -0.16874 \times R - 0.33126 \times G + 0.50000 \times B$$

$$V = 0.50000 \times R - 0.41869 \times G - 0.08131 \times B$$

Then, the NR processing unit 1011 applies known noise reduction processing to the R, G, B, U, and V signals, and outputs image data including planes of the R, G, B, U, and V signals which have undergone the noise reduction processing to a combining unit 1020. The noise reduction processing may use, for example, a method of detecting a direction of edge components included in an image, and reducing noise components by smoothing processing using a low-pass filter along the direction.

An edge detection unit 1012 synchronizes the first-resolution image data output from the memory 1010 to generate R, G, and B signals for each pixel, and generates Y (luminance) signals of luminance components by:

$$Y=0.29900 \times R+0.58700 \times G+0.11400 \times B$$

Then, the edge detection unit 1012 applies an edge detection filter to the Y signals, and outputs the outputs of the filter as edge intensity output signals to the combining unit 1020. The edge detection unit 1012 may generate edge intensity output signals from G signals in place of the Y signals. Note that the edge detection unit 1012 may determine an edge signal of a very low level as a noise component, that is, it may not determine such signal as an edge signal in detection of edge signals. In this case, processing of the NR processing unit 1011 may be omitted.

Processing to be applied to the second-resolution image data stored in the memory 1110 and the third-resolution image data stored in the memory 1210 will be described below.

An NR processing unit 1111 generates Y signals of luminance components and U and V signals of chrominance components by the aforementioned equations using R, G, and B signals of the second-resolution image data output from the memory 1110. Then, the NR processing unit 1111 applies known noise reduction processing to the Y, U, and V signals, and outputs image data including planes of the Y, U, and V signals which have undergone the noise reduction processing to a combining unit 1120.

Also, an edge detection unit 1112 applies an edge detection filter to Y signals generated by the same method as the NR processing unit 1111, and outputs the outputs of the filter as edge intensity output signals to the combining unit 1120.

An NR processing unit 1211 generates Y signals of luminance components and U and V signals of chrominance components by the aforementioned equations using R, G, and B signals of the third-resolution image data output from the memory 1210. Then, the NR processing unit 1211 applies known noise reduction processing to the Y, U, and V signals, and outputs image data including planes of the Y, U, and V signals which have undergone the noise reduction processing to a memory 1221.

Of formats of signals held by the memories 1121 and 1221, the luminance components are configured by a Y data format. For this reason, compared to a case in which R, G, and B signals are stored as luminance components, the signal amount of the luminance components to be held by each of the memories 1121 and 1221 can be reduced to ⅓.

A US unit 1222 reads out the Y signals as the luminance components and the U and V signals as the chrominance components from the memory 1221, applies up-sampling (enlargement) processing to these signals to have the same number of pixels as the second-resolution image data, and outputs the up-sampled signals to the combining unit 1120.

The combining unit 1120 combines the image data output from the NR processing unit 1111 and that output from the US unit 1222 according to edge intensity output signals as the outputs from the edge detection unit 1112. More specifically, when each edge intensity output signal is large (it indicates a large edge), a combining ratio of the signals included in the image data output from the NR processing unit 1111 is increased. In this way, image data in which noise components are suppressed more strongly in a uniform region where noise is apt to be conspicuous while assuring high sharpness levels at contours and boundaries of objects can be generated.

As formats of the image data to be combined by the combining unit 1120, the luminance components are configured by the Y data format, and the chrominance components are configured by U and V data formats. Y signals as the luminance components and U and V signals as the chrominance components of the two image data are respectively independently combined by the combining unit 1120, and the memory 1121 holds the luminance components as Y signals, and the chrominance components as U and V signals.

A US unit 1122 reads out the Y signals as the luminance components and the U and V signal as the chrominance components from the memory 1121, and applies up-sampling processing to these signals to have the same number of pixels as the first-resolution image data. Then, image data which has undergone the up-sampling processing by the US unit 1122 is input to a format conversion unit 1021.

The format conversion unit 1021 generates R, G, and B signals of image data to be output to the combining unit 1020 from the up-sampled Y signals as the luminance components and the up-sampled U and V signals as the chrominance components based on, for example, known conversion formulas, which are given by:

$$R = Y + 1.40200 \times V$$

$$G = Y - 0.34414 \times U - 0.71414 \times V$$

$$B = Y + 1.77200 \times U$$

Note that as the U and V signals as the chrominance components, the up-sampled U and V signals are used intact.

The combining unit 1020 combines the image data output from the NR processing unit 1011 and that output from the format conversion unit 1021 according to edge intensity output signals as the outputs from the edge detection unit 1012, and stores the combined image data in a memory 1030. More specifically, when each edge intensity output signal is large (it indicates a large edge), a combining ratio of signals in the image data output from the NR processing unit 1011 is increased. As formats of the image data to be combined, the luminance components are configured by synchronized R, G, and B data formats, and the chrominance components are configured by U and V data formats. R, G, and B signals as the luminance components and the U and V signals as the chrominance components of these two image data are respectively independently combined by the combining unit 1020, and the memory 1030 stores R, G, and B signals as the luminance components, and U and V signals as the chrominance components.

The reason why the luminance components of the first-resolution image data are configured by the R, G, and B data format, and those of the second- and third-resolution image data are configured by the Y data format will be described below.

Since R, G, and B signals are generated via color filters having different optical characteristics, they should undergo independent gamma processes so as to generate high-precision signals. When Y signals are generated after the R, G, and B signals undergo the independent gamma processes, the Y signals can be generated after optical characteristic differences due to color filter differences can be compensated for by the gamma processes. However, when gamma processing is applied after Y signals are generated, the optical characteristic differences due to the color filter differences cannot be compensated for by the gamma processing. Hence, in order to obtain high-precision signals, after the R, G, and B signals undergo the independent gamma processes, the Y signals have to be generated.

However, since the second- and third-resolution image data have resolutions lower than the first-resolution image data, an adverse effect caused by generation of Y signals before the gamma processing can be ignored. Unless Y signals are generated from R, G, and B signals before gamma processing in the first-resolution image data which is required to have higher precision, even when Y signals are generated before gamma processing in image data having lower resolutions than the first-resolution image data, an influence on image quality is negligible.

Hence, in this embodiment, both high image quality and reduced memory capacities can be realized since only the luminance components of the first-resolution image data having the highest resolution are configured by the R, G, and B data formats, and those of the image data other than the first-resolution image data are configured by the Y data format.

Of the image data output from the memory 1030, the R, G, and B signals independently undergo gamma processes by an R gamma circuit 1032, G gamma circuit 1033, and B gamma circuit 1034, respectively. The R, G, and B signals as the luminance components are input to a known edge enhancement unit 1040, which outputs edge enhancement signals. A Y signal generation unit 1041 outputs luminance signals based on the R signals output from the R gamma circuit 1032, the G signals output from the G gamma circuit 1033, the B signals output from the B gamma circuit 1034, and the edge enhancement signals output from the edge enhancement unit 1040. In this manner, the Y signals can be generated based on the R, G, and B signals after the gamma processing.

Figure 3:
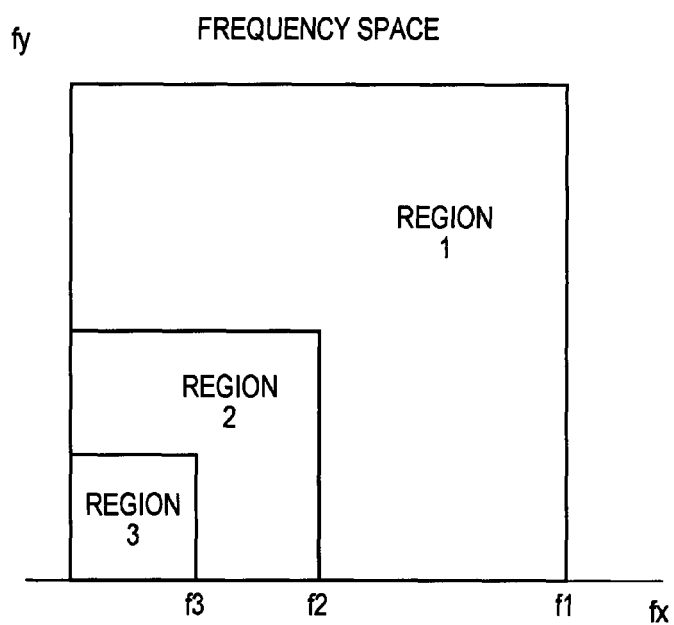
FIG. 3 is a view showing an example of a frequency space of image data according to the embodiment.
Figure 4:
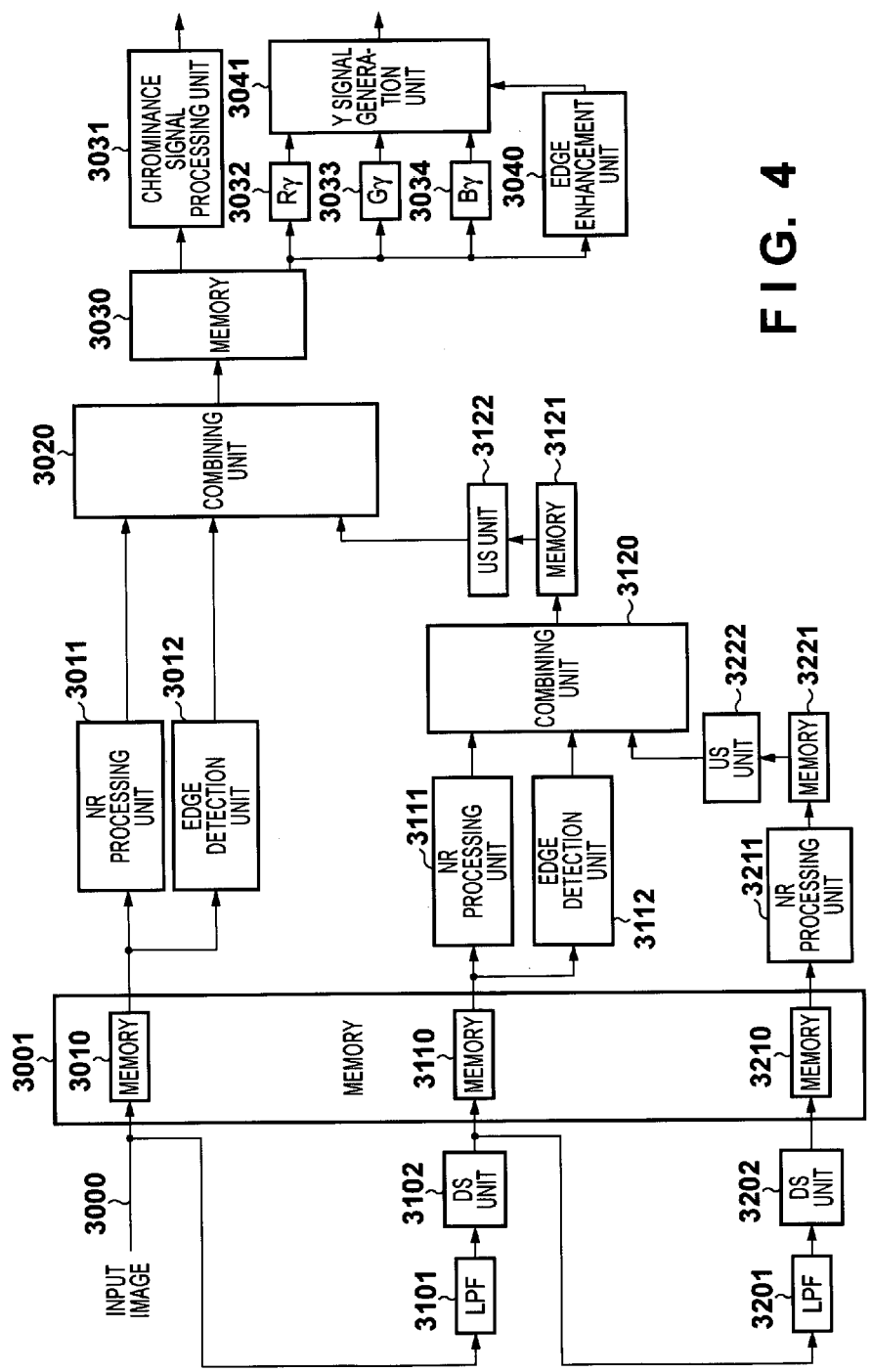
FIG. 4 is a block diagram showing a conventional arrangement.
Figure 5:
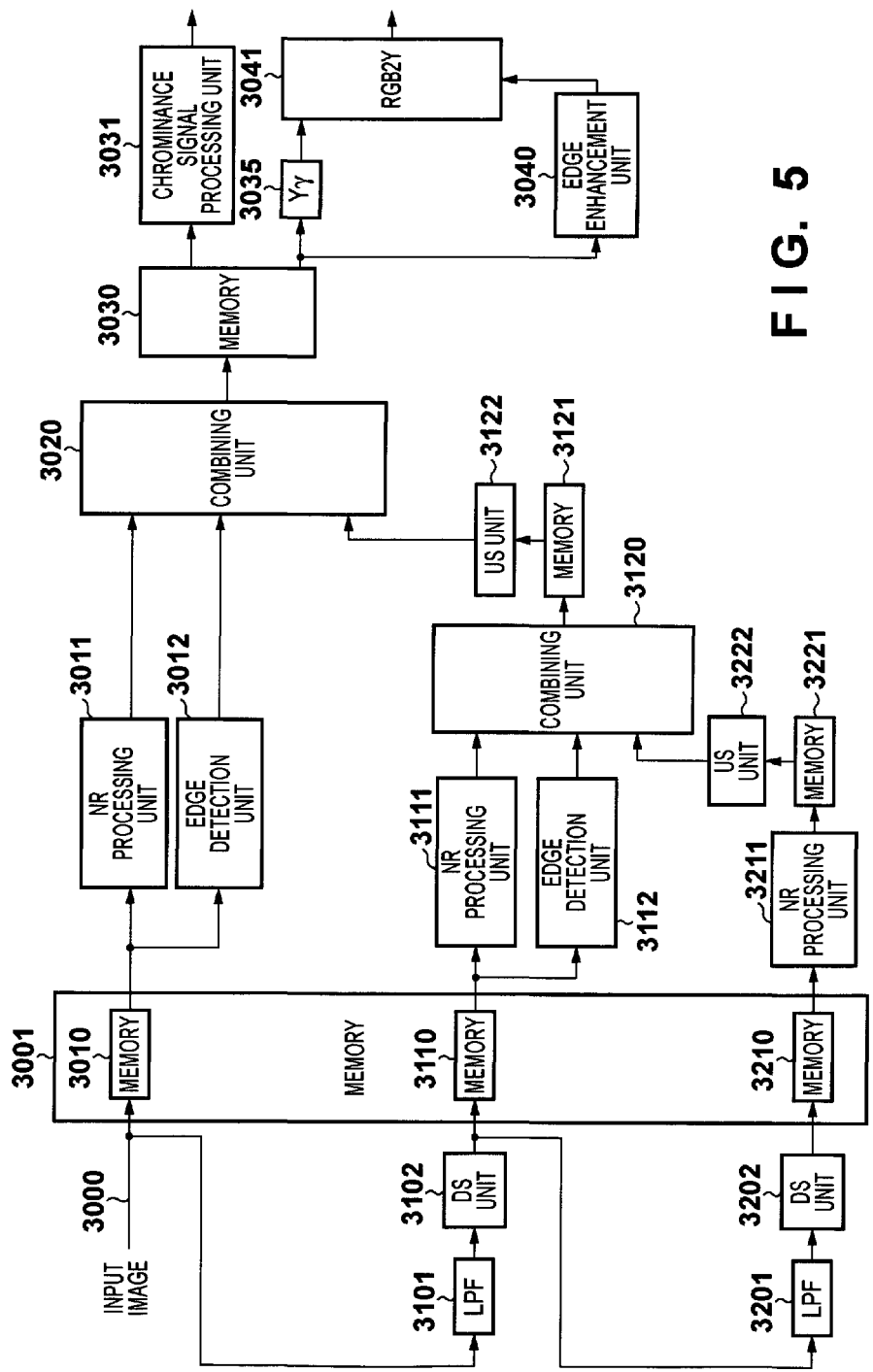
FIG. 5 is a block diagram showing another conventional arrangement.

FIG. 3 shows a frequency space of the image data in the memories 1010, 1110, and 1210. A highest frequency of the image data in the memory 1010 is expressed by f1, that of the image data in the memory 1110 is expressed by f2, and that of the image data in the memory 1210 is expressed by f3 (f1>f2>f3).

The image data around the frequency f1 includes not only edge signals but also noise components. The NR processing unit 1011 removes signals, which have too small amplitude levels as edges, as noise components, while preserving edge signals.

In this example, the image data around the frequency f1 of a region 1 is detected as an edge region by the edge detection unit 1012, and the combining unit 1020 outputs more data from the NR processing unit 1011.

Image data around the frequency f2 of a region 2 is not detected as an edge region by the edge detection unit 1012, and the combining unit 1020 uses the outputs from the format conversion unit 1021. On the other hand, this image data is detected as an edge region by the edge detection unit 1112, and the combining unit 1120 outputs more data from the NR processing unit 1111.

Image data around the frequency f3 of a region 3 is not detected as an edge region by the edge detection unit 1012, and the combining unit 1020 uses the outputs from the format conversion unit 1021. Also, this image data is not detected as an edge region by the edge detection unit 1112, and the combining unit 1120 outputs more data from the NR processing unit 1211.

In this manner, on the high frequency side of image data, the outputs of the NR processing unit 1011 are used. Therefore, as the components on the high frequency side of the image data, the luminance component signals which maintain the high resolution are input to the memory 1030, and are then input to the R, G, and B gamma circuits 1032, 1033, and 1034.

The U and V signals as the chrominance components output from the memory 1030 are input to a chrominance signal processing unit 1031, which outputs chrominance signals. The chrominance signal processing unit 1031 is configured by known MATRIX, gamma, CKnee, and the like.

As described above, the R, G, and B signals are used as luminance components of the two image data to be input to the combining unit 1020. Furthermore, the Y signals are held as luminance components in the memory 1121, and are converted into R, G, and B signals by the format conversion unit 1021 when they are used. In this way, a hardware arrangement which can generate luminance signals of at least three planes from the R, G, and B signals after the gamma processing, and can reduce memory capacities can be realized. Also, the luminance components of the first-resolution image data are output as the R, G, and B signals while maintaining a high resolution.

This embodiment has explained the processes of three layers. However, the present invention is not limited to this, and processes of N layers (N>2) may be executed. Also, in place of each NR processing unit, circuits including other image processing functions such as an aberration processing unit which attains aberration correction, and a false color processing unit which attains false color correction may be arranged. Furthermore, the apparatus may be configured to generate only Y signals as luminance components from image data which has undergone the down-sampling processing, to apply the up-sampling processing to the Y signals without the aforementioned image processes, and to output the up-sampled signals to the combining unit. Even with such configuration, a noise reduction effect can be obtained.

Note that in this embodiment, image generation means of the present invention corresponds to the LPF 1101 and DS unit 1102, and second image generation means corresponds to the LPF 1201 and DS unit 1202. Luminance signal generation means corresponds to the NR processing unit 1111, second luminance signal generation means corresponds to the NR processing unit 1211, storage means corresponds to the memory 1121, and second storage means corresponds to the memory 1221. Conversion means corresponds to the format conversion unit 1021 and US unit 1122, second conversion means corresponds to the US unit 1222, combining means corresponds to the combining unit 1020, and second combining means corresponds to the combining unit 1120.

Second Embodiment

The second embodiment will be described below with reference to FIG. 2. In this embodiment, a rearrangement unit 5022 is added after a combining unit 1020 in the first embodiment. A description of points common to the first embodiment will not be repeated, and different points will be mainly explained below.

Figure 2:
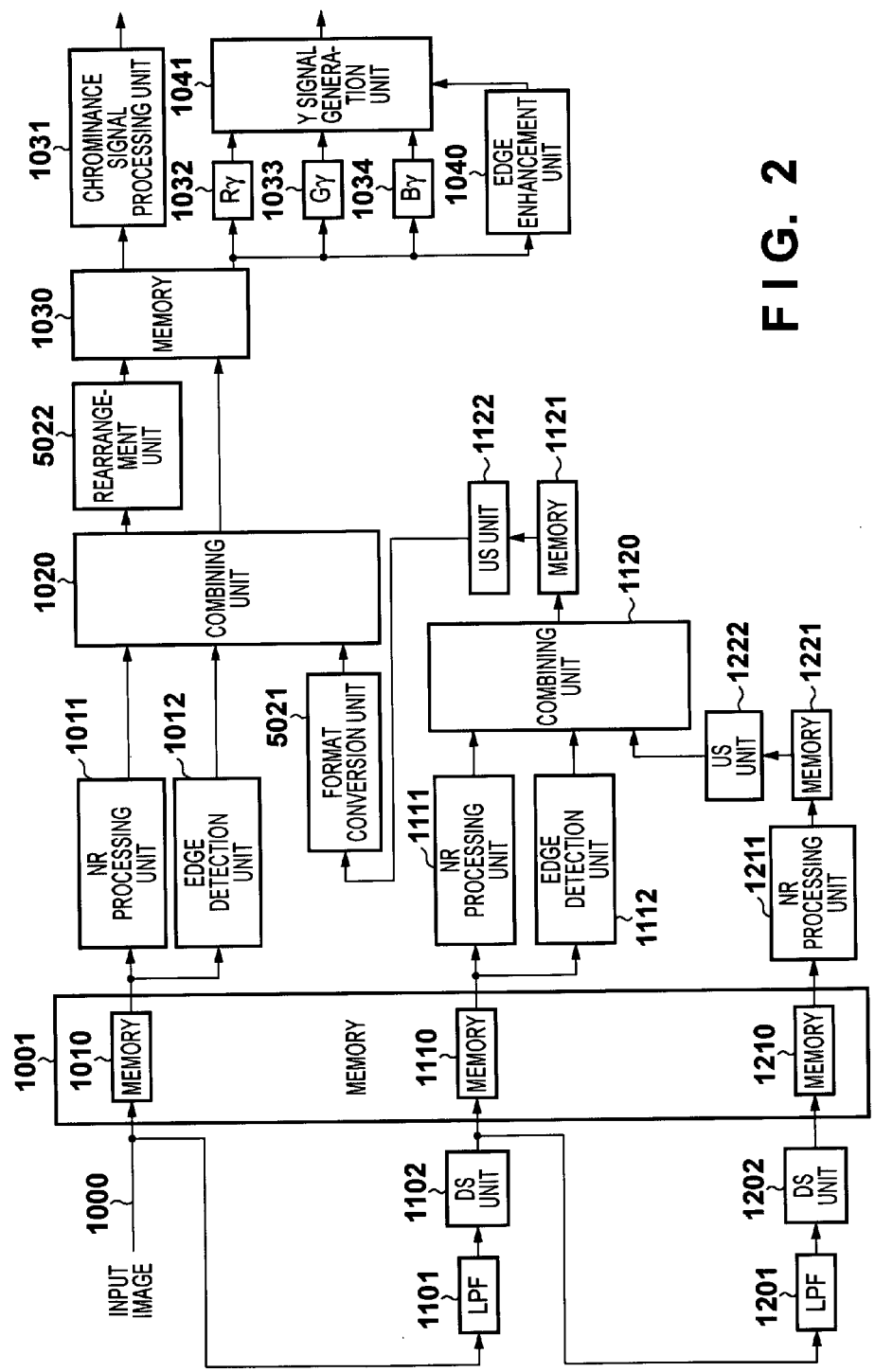
FIG. 2 is a block diagram showing the arrangement of an image processing apparatus according to the second embodiment of the present invention.

Referring to FIG. 2, the combining unit 1020 combines first-resolution image data from an NR processing unit 1011 and that output from a format conversion unit 5021 (to be described later) according to edge intensity output signals as outputs from an edge detection unit 1012, and stores the combined data in a memory 1030. More specifically, when each edge intensity output signal is large (it indicates a large edge), a ratio of signals of image data on the higher-frequency side is increased. As formats of the two image data to be combined, luminance components are configured by synchronized R, G, and B data formats, and chrominance components are configured by U and V data formats. R, G, and B signals as the luminance components, and U and V signals as the chrominance components are respectively independently combined by the combining unit 1020.

Figure 6A:
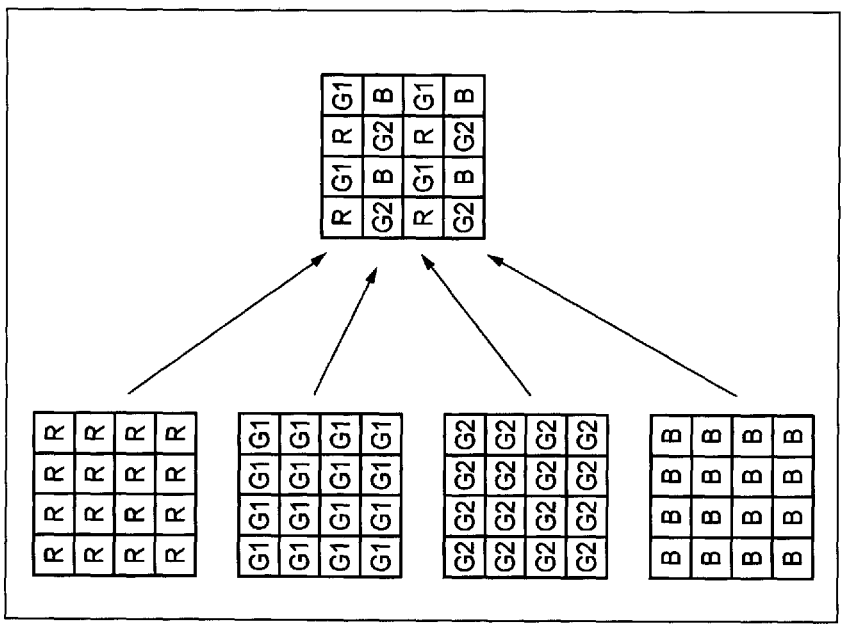
FIGS. 6A and 6B are views for explaining rearrangement processing according to the embodiment.
Figure 6B:
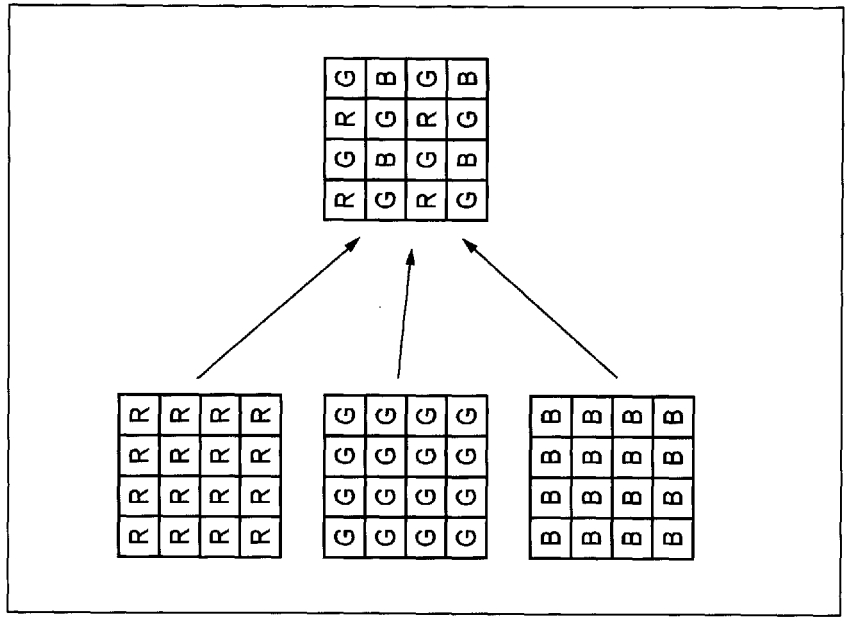

Rearrangement processing in the rearrangement unit 5022 will be described below with reference to FIGS. 6A and 6B. The rearrangement unit 5022 rearranges synchronized R, G, and B signals to a format of a Bayer matrix. That is, of G signals input to the rearrangement unit 5022, only those which match positions of G pixels in the Bayer matrix are extracted, and are stored in the memory 1030. The same processing is applied to R and B signals. In this manner, luminance signals can be expressed by a signal amount for one plane, and the signal amount stored in the memory 1030 can be reduced.

Referring back to FIG. 2, the R, G, and B signals as the luminance components are rearranged to the format of the Bayer matrix by the aforementioned rearrangement unit 5022, and are held as Bayer matrix signals of the luminance components and U and V signals of the chrominance components in the memory 1030.

The R, G, and B signals as the Bayer matrix signals of the luminance components output from the memory 1030 independently undergo gamma processes by an R gamma circuit 1032, G gamma circuit 1033, and B gamma circuit 1034, respectively. A Y signal generation unit 1041 synchronizes the R, G, and B signals which have undergone the gamma processes, and outputs luminance signals using these synchronized signals and edge enhancement signals output from an edge enhancement unit 1040.

As described above, R, G, and B signals are used as the luminance components of both high-resolution image data and low-resolution image data to be output to the combining unit 1020. As the luminance components of the low-resolution image data, Y signals are held in the memory 1121 as luminance components, and are converted into R, G, and B signals by the format conversion unit 5021 when they are used. Furthermore, the synchronized luminance signals output from the combining unit 1020 are rearranged to the format of the Bayer matrix, and are stored in the memory 1030. In this manner, a hardware arrangement which can generate luminance signals from the R, G, and B signals after the gamma processing, and can reduce the memory capacities can be realized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-268718, filed Dec. 1, 2010, which is hereby incorporated by reference herein in its entirety.

The invention claimed is:

1. An image processing apparatus comprising:
an image generation unit configured to generate, from first-resolution image data including signals according to a plurality of color filters, second-resolution image data including signals according to the plurality of color filters at a resolution lower than the first-resolution image data;
a luminance signal generation unit configured to generate luminance signals from the signals according to the plurality of color filters of the second-resolution image data;
a storage unit configured to store image data including the luminance signals;
a conversion unit configured to generate enlarged image data by using the stored image data, the enlarged image data includes signals according to the plurality of color filters; and
a combining unit configured to combine the first-resolution image data and the enlarged image data.

2. The apparatus according to claim 1, further comprising:
a second image generation unit configured to generate third-resolution image data, which includes signals according to the plurality of color filters at a resolution lower than the second-resolution image data, from the second-resolution image data;
a second luminance signal generation unit configured to generate second luminance signals from the signals according to the plurality of color filters of the third-resolution image data;
a second storage unit configured to store image data including the second luminance signals;
a second conversion unit configured to generate second enlarged image data by using the image data stored in the second storage unit, the second enlarged image data includes luminance signals; and
a second combining unit configured to combine image data including the luminance signals generated by the luminance signal generation unit and the second enlarged image data to generate the image data stored in the storage unit.

3. The apparatus according to claim 1, further comprising a gamma processing unit respectively corresponding to the signals according to the plurality of color filters of the image data combined by said combining unit.

4. The apparatus according to claim 1, wherein said conversion unit enlarges the stored image data and then generates the enlarged image data including the signals according to the plurality of color filters.

5. The apparatus according to claim 1, wherein the number of pixels of the enlarged image data is equal to that of the first resolution image data.

6. The apparatus according to claim 1, further comprising a chrominance signal generation unit configured to generate chrominance signals from the signals according to the plurality of color filters of the second-resolution image data,
wherein the stored image data includes the chrominance signals.

7. An image processing method comprising:
an image generation step of generating, from first-resolution image data including signals according to a plurality of color filters, second-resolution image data including signals according to the plurality of color filters at a resolution lower than the first-resolution image data;

a luminance signal generation step of generating luminance signals from the signals according to the plurality of color filters of the second-resolution image data;

a storage step of storing image data including the luminance signals;

a conversion step of generating enlarged image data by using the stored image data, the enlarged image data includes signals according to the plurality of color filters; and a combining step of combining the first-resolution image data and the enlarged image data.

8. The method according to claim 7, further comprising:

a second image generation step of generating third-resolution image data, which includes signals according to the plurality of color filters at a resolution lower than the second-resolution image data, from the second-resolution image data;

a second luminance signal generation step of generating second luminance signals from the signals according to the plurality of color filters of the third-resolution image data;

a second storage step of storing image data including the second luminance signals;

a second conversion step of generating second enlarged image data by using the image data stored in the second storage step, the second enlarged image data includes luminance signals; and a second combining step of combining image data including the luminance signals generated in the luminance signal generation step and the second enlarged image data to generate the image data stored in the storage step.

9. The method according to claim 8, further comprising gamma processing steps respectively corresponding to the signals according to the plurality of color filters of the image data combined in the combining step.

10. The method according to claim 7, wherein in the conversion step, the stored image data is enlarged and the enlarged image data including the signals according to the plurality of color filters is then generated.

11. The method according to claim 7, wherein the number of pixels of the enlarged image data is equal to that of the first resolution image data.

12. The method according to claim 7, further comprising a chrominance signal generation step of generating chrominance signals from the signals according to the plurality of color filters of the second-resolution image data, wherein the stored image data includes the chrominance signals.

13. A non-transitory computer-readable storage medium storing a program for controlling a computer to execute an image processing method, the method comprising:

an image generation step of generating, from first-resolution image data including signals according to a plurality of color filters, second-resolution image data including signals according to the plurality of color filters at a resolution lower than the first-resolution image data;

a luminance signal generation step of generating luminance signals from the signals according to the plurality of color filters of the second-resolution image data;

a storage step of storing image data including the luminance signals;

a conversion step of generating enlarged image data by using the stored image data, the enlarged image data includes signals according to the plurality of color filters; and a combining step of combining the first-resolution image data and the enlarged image data.

* * * * *